MAXIM & LOCKWOOD.
Gas Machine.
No. 78,465.  Patented June 2, 1868.
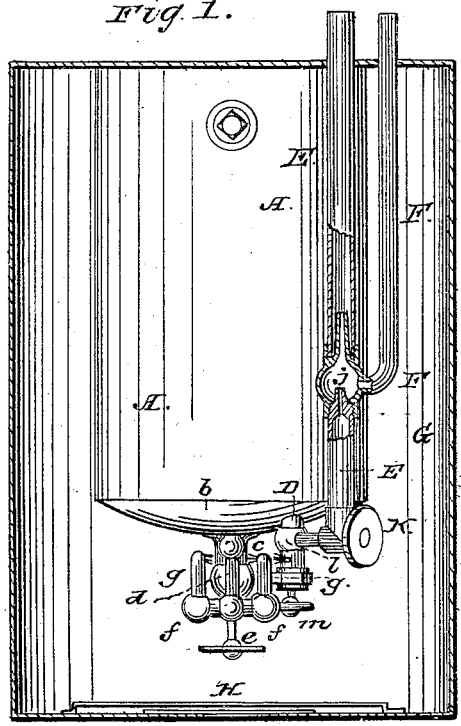
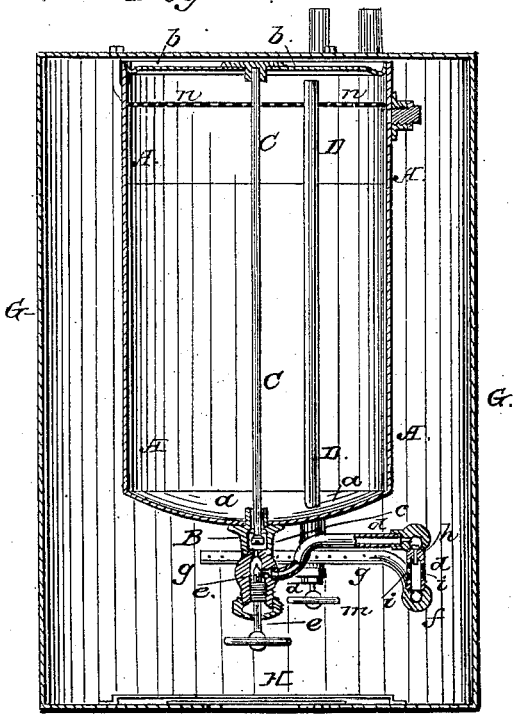
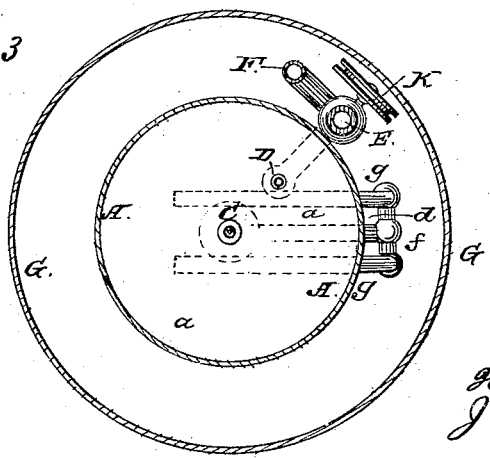

UNITED STATES PATENT OFFICE.

HIRAM S. MAXIM AND JOHN F. LOCKWOOD, OF NEW YORK, N. Y.

IMPROVED GAS-MACHINE.

Specification forming part of Letters Patent No. 78,465, dated June 2, 1868.

*To all whom it may concern:*

Be it known that we, HIRAM S. MAXIM and JOHN F. LOCKWOOD, of the city, county, and State of New York, have made and invented a new and Improved Gas-Machine; and we do hereby declare that the following is a full, clear, and exact description thereof, which will enable others skilled in the art to make and use the same, reference being had to the accompanying drawings, forming part of this specification, in which—

Figure 1 represents a side elevation, partly in section, of our improved gas-machine. Fig. 2 is a vertical central section of the same, and Fig. 3 is a horizontal section of the same.

Similar letters of reference indicate corresponding parts.

This invention relates to a new gas-making device which is more particularly intended for use on railroad-cars.

The invention chiefly consists in heating the hydrocarbon in the reservoir by a flame produced from the contents of the reservoir, the gas thus produced operating a valve which, when closed, prevents the further escape of liquids to the flame. When the heat is too high it will cause the gas in the reservoir to expand and to close the valve. The fire will then go out until so much of the gas has escaped that the valve will again open, when the fire will at once be started again. The heat brought to bear upon the tank is thus governed and controlled by the state of the contents of the tank.

A in the drawings represents a cylindrical or other tank, made of sheet metal or other suitable material. Its bottom $a$ is perforated and contains a valve, B, which is, by means of a rod, C, connected with the sheet-metal cover $b$ of the tank. The valve is thus suspended from the cover, and is held open by the same, unless a certain pressure is brought against the under side of the cover, when it will be drawn up to close the valve. The valve B allows the contents of the tank to flow in a very small stream into a pipe, $c$, from which a horizontal pipe, $d$, branches off, as shown. The connection between the pipes $c$ and $d$ can be closed by means of a valve, $e$, which can be operated by hand from the outside, as shown, so that when it is closed no liquid can flow from the tank into the pipe $d$. The pipe $d$ is branched off at $ff$, Fig. 1, and from the branches project two parallel horizontal pipes, $g$ $g$, which are perforated on their opposite sides and which are closed at their outer ends.

As the tank is filled with gasoline or other hydrocarbon liquid, a portion of this liquid flows into the pipe $g$. The contents of the pipe $g$ can be ignited, when the flames will surround the pipe $c$, and will thereby heat not only the liquid flowing through $c$, $d$, $f$, and $g$, but also that contained in the tank. The liquid flowing through $c$ will by the heat be evaporated, and will as gas flow with great force through the pipe $d$, in which a contracted portion, $h$, is arranged, as shown in Fig. 2. The gas will thus form a jet, as indicated, and will produce a partial vacuum behind it, whereby it will suck air into the pipe $d$ through apertures $i$ $i$. The gas is thus mixed with air, and will be better fuel and not apt to condense. When the contents of the tank are becoming heated gas will be generated in the tank, which will escape from the upper part of the tank through a pipe, D. To prevent the liquid from splashing into the pipe D, a finely-perforated false cover, $n$, has been fitted across the tank, below the mouth of the pipe D. From the lower end of the pipe D the gas is conducted into another pipe, E, in which a narrow tube, $j$, is arranged to cause a jet to be produced which will suck air in through a tube, F, or through apertures. The air will thus be carbureted, and can in this state pass off to the burners through the continuation of the pipe E.

It will be noticed that the jets produced in the pipes $d$ and E are both caused by the escaping force of the heated gas, and that by this force the partial vacuum is produced behind the jet, which will draw the air into the pipe and will cause the carbureting of the air, as above set forth. The escape of gas through the pipe E can be regulated by means of a valve, $k$.

Should the contents of the tank become heated beyond a certain degree by the flames on the pipes $g$, the pressure of the gas in the tank will cause the elastic cover $b$ to be slightly raised, whereby the valve B is closed. Further supply to the pipes $g$ is thus stopped, and the flames will be extinguished, ceasing to heat the tank. When the pressure in the tank ceases the cover $b$ will resume its former position and will reopen the valve B. The pipes $g$ will then be supplied, and the gas escaping from them will be ignited by a small flame, $l$, which is kept constantly burning near the foot of the pipe D, as shown. A valve, $m$, can close the supply to the flame $l$. The flame on $g$ will be increased or diminished, as the vapors become weaker or stronger in the tank.

This whole apparatus can be protected by an outer case, G, with a valve, H, in its bottom, to let in the requisite supply of air, and can be suspended below a car or be otherwise set up wherever desired.

The valve-rod C serves also as a stay-rod to brace the tank.

Having thus described our invention, we claim as new and desire to secure by Letters Patent—

1. In an apparatus for making carbureted air, controlling the heat used for evaporating the hydrocarbon liquid by the pressure of the contents of the vessel in which the said liquid is held, as set forth.

2. Constructing the tank A with an elastic head, side, or bottom, $b$, by which the position of the valve B is controlled, as set forth.

3. Drawing the air to be carbureted into the pipes through which the hydrocarbon vapor is conducted by means of the escaping force of the vapor, as set forth.

4. The manner herein described of heating or boiling hydrocarbon liquid with a flame of its own gas, said flame being increased or diminished by the pressure of the vapor so generated, as set forth.

5. The tank A, valve B, pipes $c$, $d$, $f$, and $g$, arranged and operating, as set forth, to cause the heating of the contents of the tank, as set forth.

6. The above in combination with the elastic head $b$, made as set forth.

7. Arranging an independent burner, $l$, in the pipe D, substantially as set forth, for the purpose of igniting the burners $g g$, as specified.

8. The jet-pipe $j$, arranged in the tube E, for the purpose of causing the escaping vapors to draw air into the tube E and to have such air carbureted, as set forth.

9. The outer case, G, in combination with the gas apparatus, as set forth, said case being provided with apertures or valves.

10. A gas-machine made and operating substantially as herein shown and described, and consisting of the tank A, elastic head $b$, valve-rod C, valves B, pipes $c$, $d$, $f$, and $g$, discharge-pipes D and E, jets $h$ and $j$, burner $l$, and splashing-board $n$, all made as set forth.

HIRAM S. MAXIM.
JNO. F. LOCKWOOD.

Witnesses:
W. C. ASHKETTLE,
ALEX. F. ROBERTS.